(12) United States Patent
Karita

(10) Patent No.: US 6,872,334 B2
(45) Date of Patent: Mar. 29, 2005

(54) MANUFACTURING METHOD OF COMPOUND ASPHERIC LENS

(75) Inventor: Nobuki Karita, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 326 days.

(21) Appl. No.: 10/292,291

(22) Filed: Nov. 12, 2002

(65) Prior Publication Data

US 2003/0099783 A1 May 29, 2003

(30) Foreign Application Priority Data

Nov. 27, 2001 (JP) ........................................ 2001-360632

(51) Int. Cl.$^7$ ............................................. B29D 11/00
(52) U.S. Cl. .......................... 264/1.38; 264/1.7; 264/85; 425/808
(58) Field of Search ............................... 264/1.1, 1.36, 264/1.38, 1.7, 2.5, 85; 425/808; 427/163.1, 162, 164

(56) References Cited

U.S. PATENT DOCUMENTS

| | | | | |
|---|---|---|---|---|
| 4,432,832 A | * | 2/1984 | Fantone | ...................... 216/24 |
| 4,623,496 A | * | 11/1986 | Verhoeven et al. | .......... 264/1.7 |
| 4,756,972 A | * | 7/1988 | Kloosterboer et al. | ...... 428/417 |
| 4,957,663 A | * | 9/1990 | Zwiers et al. | .............. 264/1.38 |
| 5,643,504 A | * | 7/1997 | Chiba | ........................ 264/1.7 |

FOREIGN PATENT DOCUMENTS

JP  3191447  5/1994

\* cited by examiner

*Primary Examiner*—Mathieu D. Vargot
(74) *Attorney, Agent, or Firm*—Jordan and Hamburg LLP

(57) ABSTRACT

A method including: dropping the ultraviolet-curable resin fluid onto the aspheric face of a metallic mold set horizontally, the aspheric face having a desired concave face; bringing a convex lens close to the metallic mold and stopping the movement of the lens just before it comes into contact with the ultraviolet-curable resin fluid; inclining the metallic mold and the lens together to cause the ultraviolet-curable resin fluid to flux; after bringing the convex face of the lens into point contact with this fluxed and swelled ultraviolet-curable resin fluid, moving the lens to a prescribed position relative to the metallic mold to place the ultraviolet-curable resin fluid between the lens and the metallic mold; returning the lens and the metallic mold together from the inclined state to the horizontal state, thereby irradiating the ultraviolet-curable resin fluid with ultraviolet rays to cure the resin fluid and form a molded resin layer.

9 Claims, 4 Drawing Sheets

MANUFACTURING METHOD OF COMPOUND ASPHERIC LENS

BACKGROUND OF THE INVENTION

1. Field of the Invention

The present invention relates to a method of manufacturing compound aspheric lenses.

2. Description of the Related Art

Lenses used in optical apparatuses including cameras and microscopes are mostly made of glass lens. Glass lenses are manufactured, each to have a desired curvature, by machining glass blocks (also known as lens blanks) produced by press-forming molten glass. Methods of manufacturing resin lenses are also in practice, by which resin instead of glass is press-formed, injection-molded, teemed or fabricated otherwise. These methods have the advantage of a lower manufacturing cost because, once molds are produced, they can be used for a large number of lenses. However, resin lenses have the fatal disadvantage of the high susceptibility of their optical performance to temperature variations, and therefore they are not used for precision lenses.

Incidentally, there are lenses known as aspheric lenses, namely lenses whose surface is not spheric. Because of their excellent performance which spheric lenses cannot provide, aspheric lenses are found very useful. Main methods currently available for the manufacture of aspheric lenses from glass include grinding of blanks and direct pressing. However, grinding does not readily lend itself to mass production, while direct pressing has constraints in terms of the type of usable niter and the product size and requires expensive equipment.

To obviate these disadvantages, what are known as compound aspheric lenses have been developed. A compound aspheric lens consists of a thin (e.g., 5 to 100 μm) molded resin layer having an aspheric face and a glass lens which constitutes the main body. The glass lens constituting the main body has a spheric or rough aspheric face. Both components are available at low manufacturing costs. Such resin-bonded aspheric lenses, namely compound aspheric lenses, are manufactured by the following process, for instance. Thus a metallic mold having a desired aspheric face is placed horizontally, a prescribed quantity of ultraviolet-curable resin fluid is dropped onto the central part of this metallic mold, a glass lens having a spheric or aspheric face is placed over the metallic mold, the glass lens and the metallic mold are brought close to each other leaving a certain distance between them, the resin fluid is cured by irradiation with ultraviolet rays, and the cured resin is bonded to the glass lens to provide a compound aspheric lens.

The compound aspheric lens manufacturing method described above is sometimes susceptible to the entrance of bubbles (air bubbles) into the molded resin layer. The moment the resin fluid comes into contact with the metallic mold, the bubbles get in. Since bubbled products are rejected, this conventional process involves the problem of a low efficiency percentage. A process improved in efficient percentage was developed, and published in Japanese Patent No. 3191447.

The manufacturing method described in Japanese Patent No. 3191447 (a prior patented invention) consists of:

a first step of placing a glass lens having a spheric or rough aspheric face horizontally;

a second step of dropping a prescribed quantity of radiation-curable (ultraviolet-curable) resin fluid onto the central part of the glass lens;

a third step of turning upside down the glass lens;

a fourth step of mounting the glass lens over a "metallic mold having a desired aspheric face";

a fifth step of bringing the glass lens and the metallic mold to positions at a prescribed distance to each other;

a sixth step of curing the resin fluid sandwiched between the glass lens and the metallic mold by irradiating it with rays (ultraviolet rays), and a seventh step of separating the cured molded resin layer from its interface with the metallic mold.

SUMMARY OF THE INVENTION

According to the prior patented invention, "dropping the resin fluid onto the central part of the glass lens" at the second step might cause this resin fluid to flow down from the central part of the glass lens or drop off when the lens is turned upside down at the next third step unless the resin fluid is extremely viscous if its final quantity is large enough to provide the desired molded resin layer. Also, the smaller the radius of curvature of the convex face of the central part of the glass lens, the more likely the resin fluid is to flow down. Where a molded resin layer of 150 μm in central thickness and 51 mm in outside diameter, for instance, is to be formed, when 0.123 g of a resin fluid (whose required quantity for forming the molded resin layer is 0.522 g) of 1000 cps in viscosity is dropped onto the central part of a concave lens of 37 (mm) in radius of curvature R and this concave lens is turned upside down, the resin fluid drops off. Where a molded resin layer of 200 μm in central thickness and 57 mm in outside diameter is to be formed, when 0.095 g of a resin fluid (whose required quantity for forming the molded resin layer is 0.355 g) of 1000 cps in viscosity is dropped onto the central part of a convex lens of 99 (mm) in radius of curvature R and this convex lens is turned upside down, the resin fluid also drops off.

Even though bubbles (air bubbles) are prevented from entering the molded resin layer, at the step of separating the cured molded resin layer obtained by ultraviolet irradiation of the resin fluid, sandwiched between the lens and the metallic mold, from its interface with the metallic mold, exfoliation arises on the interface between the molded resin layer and the lens or white feather-like cracks or fissures occur in the molded resin layer of the manufactured compound aspheric lens, resulting in a low efficiency percentage.

In view of these problems, the present invention is intended to enhance the efficiency percentage by making it difficult for bubbles (air bubbles) to enter the molded resin layer at the manufacturing step by a different method from the prior patented invention and preventing cracks, fissures, exfoliation or the like from occurring in the molded resin layer of the manufactured compound aspheric lenses.

In order to achieve the object stated above, according to the invention, nitrogen gas is supplied into a syringe for storing ultraviolet-curable resin fluid; the ultraviolet-curable resin fluid purged with this nitrogen gas is dropped onto the aspheric face of a metallic mold set horizontally, the aspheric face having a desired concave; a convex lens to constitute the base of an aspheric lens is brought close to the metallic mold and the movement of the lens is stopped just before it comes into contact with the ultraviolet-curable resin fluid; the metallic mold and the lens are inclined together to cause the ultraviolet-curable resin fluid to flux; after bringing the lens into contact with this fluxed and swelled ultraviolet-curable resin fluid in a narrow range, the lens is moved to a prescribed position relative to the metallic mold to place the ultraviolet-curable resin fluid between the lens and the metallic mold; the lens and the metallic mold together, with the ultraviolet-curable resin fluid held between them, are returned from the inclined state to the horizontal state; then the ultraviolet-curable resin fluid is irradiated with ultraviolet rays to cure the resin fluid; and the molded resin layer that has been cured is separated from its interface with the metallic mold.

By an alternative method, nitrogen gas is supplied into a syringe for storing ultraviolet-curable resin fluid; the ultraviolet-curable resin fluid purged with this nitrogen gas is dropped onto the concave face of a concave lens which is to constitute the base of an aspheric lens set horizontally; the ultraviolet-curable resin fluid purged with nitrogen gas is dropped onto the central part of the aspheric face of a metallic mold, the mold having a desired convex aspheric face, the face being directed upward, and the fluid being dropped in a quantity small enough not to drop off when the mold is inverted; this metallic mold is turned upside down and placed over the lens; the resin fluid on the concave face of the lens and the tip of the resin fluid on the aspheric face of the metallic mold are brought close enough to come into contact with each other; the gap between the lens and the metallic mold is narrowed to a prescribed extent to place the resin fluid between them; the resin fluid between the lens and the metallic mold is cured by irradiation with ultraviolet rays; and the molded resin layer that has been cured is separated from its interface with the metallic mold.

The present invention can serve to enhance the efficiency percentage because bubbles are prevented from entering the resin fluid by bringing the ultraviolet-curable resin fluid and the lens into point contact with other, or bringing the resin fluid dropped onto the concave lens into point contact with the aspheric face of the metallic mold and bringing the lens close to the metallic mold in this state. In particular, the present invention makes it not only possible but also easier than the patented invention described above to manufacture lenses even having a large aspheric face or a large central thickness of the molded resin layer. Furthermore, supplying nitrogen gas into the syringe storing ultraviolet-curable resin fluid and purging the fluid with this nitrogen gas can serve to restrain deactivation and deterioration of the ultraviolet-curable resin stored in the syringe and thereby to ensure the curing of the resin fluid by irradiation with ultraviolet rays, resulting in prevention of fissures, cracks, exfoliation and other faults in the molded resin layer and accordingly in an enhanced efficiency percentage.

DETAILED DESCRIPTION OF THE PREFERRED EMBODIMENTS

Preferred embodiments of the present invention will be described below with reference to the accompanying drawings.

Figure 1:
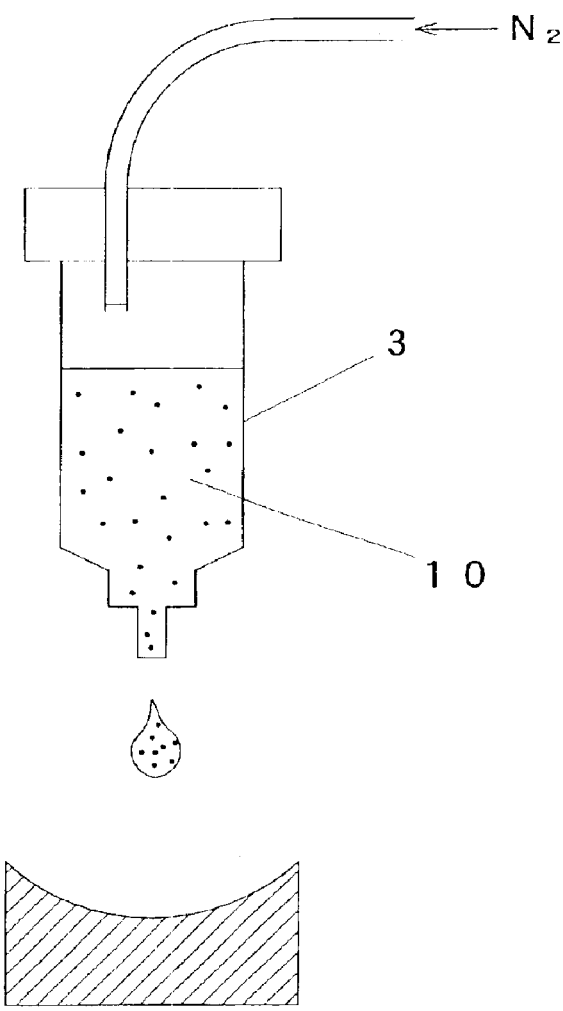
FIG. 1 shows a sectional view of a state in which ultraviolet-curable resin fluid is purged with nitrogen gas.

FIG. 1 illustrates a syringe 3 for storing ultraviolet-curable resin fluid 10. By supplying nitrogen gas ($N_2$) into this syringe 3, the ultraviolet-curable resin fluid 10 in the syringe 3 is purged with the nitrogen gas ($N_2$), and in manufacturing compound aspheric lenses, the ultraviolet-curable resin fluid 10 purged with the nitrogen gas ($N_2$) is used.

Figure 2:
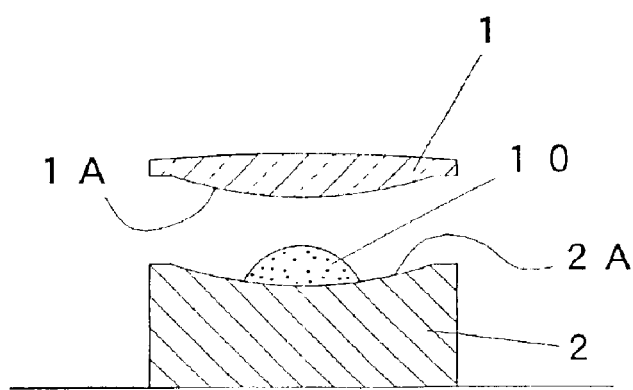
FIG. 2 shows a sectional view of a state in which ultraviolet-curable resin fluid is dropped onto a concave aspheric face of a metallic mold.
Figure 3:
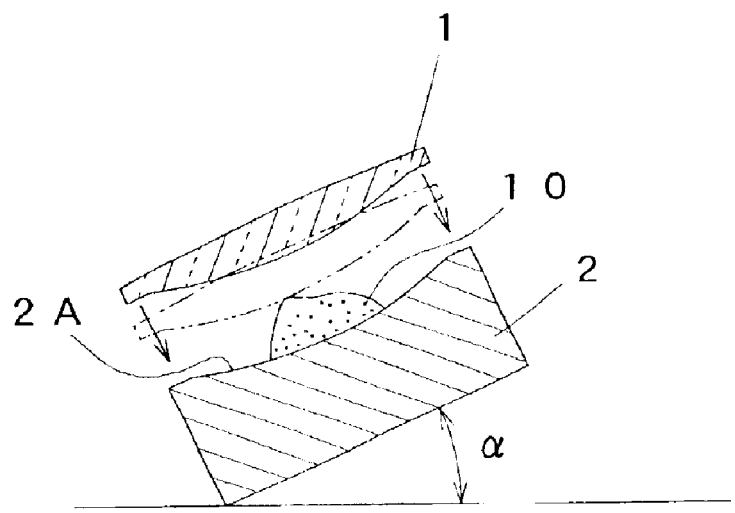
FIG. 3 shows a sectional view of a state in which a metallic mold and a lens are inclined by a certain angle.

Referring to FIG. 2, a metallic mold 2 having a desired concave aspheric face 2A is horizontally set; the ultraviolet-curable resin fluid 10 purged with nitrogen gas ($N_2$) is dropped onto that aspheric face 2A; a convex glass lens 1 to constitute the base of an aspheric lens is brought close to the metallic mold 2 and the movement of the lens 1 is stopped immediately before the convex face 1A of the lens 1 comes into contact with the ultraviolet-curable resin fluid 10. From this state in which the lens 1 is close to the metallic mold 2, the metallic mold 2 and the lens 1 are inclined together by an angle $\alpha$ as shown in FIG. 3 to flux the ultraviolet-curable resin fluid 10 towards the upper left in the drawing. In a state in which the resin fluid 10 is fluxed and swelled by the inclination of the metallic mold 2, the lens 1 is brought close to the metallic mold 2 to let the lens 1 and the resin fluid 10 come into contact with each other in a narrow range, namely to bring the resin fluid 10 into point contact with the convex face 1A. From this state of point contact, the lens 1 is further shifted to a prescribed position relative to the metallic mold 2, and the ultraviolet-curable resin fluid 10 is placed between the lens 1 and the metallic mold 2.

Figure 4:
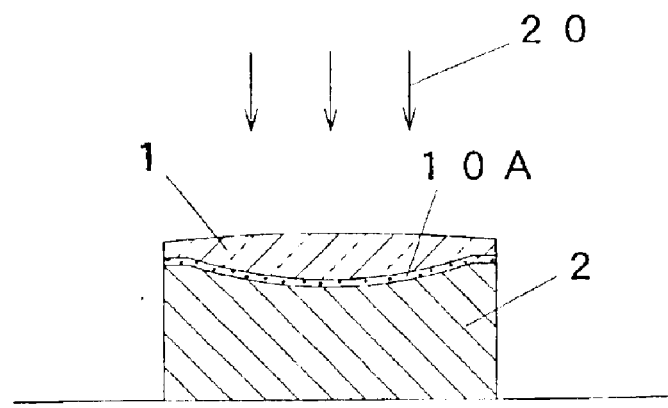
FIG. 4 shows a sectional view of a state in which the lens is brought close to the metallic mold at a certain distance, they are returned to a horizontal position, and the resin fluid is irradiated with ultraviolet rays.

In the state in which the ultraviolet-curable resin fluid 10 is held between the lens 1 and the metallic mold 2 with a prescribed gap between the lens and the mold, the lens and the metallic mold together are returned from the inclined state to the horizontal state, and the ultraviolet-curable resin fluid 10 is irradiated with ultraviolet rays 20 to cure the resin fluid 10 (see FIG. 4). When irradiated with ultraviolet rays 20 in this way, the resin fluid 10 is cured to form a molded resin layer 10A. By separating the cured molded resin layer 10A obtained in this way from its interface with the metallic mold 2, a compound aspheric lens over whose lens 1 the molded resin layer 10A is formed can be provided.

The overall inclination angle $\alpha$ of the lens 1 and the metallic mold 2 should preferably be 30 to 40 degrees. If the angle of inclination is less than 30 degrees, the flux of the resin fluid 10 will take too long a time, or if the angle of inclination is more than 40 degrees, conversely, the fluxing quantity of the resin fluid 10 in a prescribed length of time will become too large, making it difficult to bring the lens 1 and the resin fluid 10 into point contact with each other.

The suitable viscosity of the ultraviolet-curable resin fluid 10 for use here is 1000 to 1300 cps and 1000 to 2500 cps. Preferably, the ultraviolet-curable resin fluid 10 should be a photopolymeric acrylate-based ultraviolet-curable resin fluid that is cured by a radical polymeric reaction.

The central thickness of the molded resin layer 10A that is formed is about 5 to 300 $\mu$m, and its outside diameter, about $\phi$15 to 60 mm. By the manufacturing method according to this invention, lenses of which the central thickness of the molded resin layer 10A is more than 100 µm can be manufactured even easily.

The surface (the convex face 1A) of the lens 1 is silane-coupled in advance to increase its adhesiveness to the molded resin layer 10A. The silane coupling agent can be diluted to a 2 weight % ethanol solution for use in this process.

By the method of the prior art, namely in the absence of the inclination step according to this invention shown in FIG. 3, when the resin fluid 10 is dropped onto the aspheric face 2A of the metallic mold 2, the resin fluid 10 will extend horizontally by its own weight with its surface virtually flattened. Bringing the lens 1 into contact with the flat surface of the resin fluid 10, the area in which the resin fluid 10 and the lens 1 first come into contact with each other is expanded, in other words they come into face contact, and presumably the air intervening between the metallic mold 2 and the lens 1 finds no way to escape and instead becomes bubbles, with the result that bubbles (air bubbles) inevitably come in. By contrast, according to the present invention, the lens 1 is uniformly coated with the resin fluid 10 along with the approach of the lens 1 to the metallic mold 2 after the fluxed and swelled resin fluid 10 resulting from the dripping of the fluid onto the aspheric face 2A of the metallic mold 2, which is inclined together with the lens 1, and the lens 1 is brought into contact with the resin fluid 10 in a narrow range in, so to speak, point contact. Thus according to this invention, the area in which the resin fluid 10 and the lens 1 first come into contact with each other is narrowed (in point contact, so to speak), and therefore the air intervening between the lens and the mold never fails to escape and is prevented from becoming bubbles. Actual production of compound aspheric lenses by the method described above resulted in almost 100% absence of bubbles.

With this embodiment of the present invention, the ultraviolet-curable resin fluid 10 staying on the aspheric face 2A of the concave metallic mold 2 and the convex face 1A of the lens 1 come into point contact with each other, and by bringing the lens close to the metallic mold in this state, bubbles are prevented from entering the resin fluid, resulting in an enhanced efficiency percentage.

Especially this invention as embodied in the above-described manner has the advantage, over the prior patented invention (the Japanese Patent No. 3191447), of making it possible, even easy, to manufacture lenses with a large aspheric face quantity and/or a molded resin layer with a great central thickness. Thus, unlike the prior patent, this invention does not provide the resin fluid for forming the molded resin layer on the convex lens side and bring the resin fluid provided on the lens into point contact with the metallic mold by inverting the lens, there is no need to worry about dropping of the resin fluid depending on the radius of curvature of the convex face 1A of the lens or the quantity or viscosity of the resin fluid 10 that is used.

It is preferable from the viewpoint of manufacturing efficiency for the ultraviolet-curable resin fluid 10 to be used in this embodiment to have a viscosity of 1000 to 2500 cps. If its viscosity is too high, the flux and swelling of the resin fluid 10 will take too long a time when it is inclined or, conversely, if its viscosity is too low, it may readily flow down when inclined.

It is also preferable to plate the aspheric face 2A of the metallic mold 2 with nickel. This surface treatment would facilitate separation after the molded resin layer 10A is formed.

Next will be described another preferred embodiment of the present invention with reference to FIG. 5 through FIG. 7.

Figure 5A:
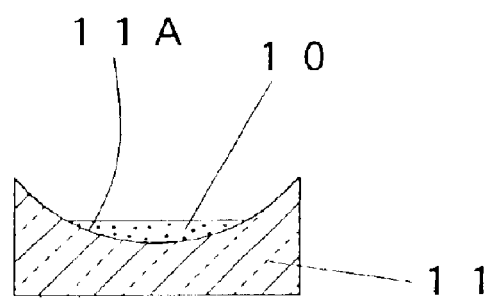
FIG. 5A shows a sectional view of a state in which ultraviolet-curable resin fluid is dropped onto the concave face of a concave lens in another embodiment of the present invention.
Figure 5B:
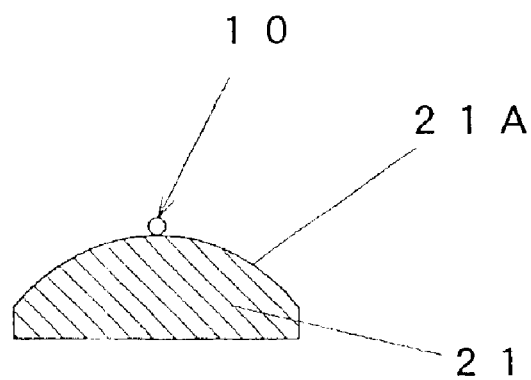
FIG. 5B shows a sectional view of a state in which one drop of ultraviolet-curable resin fluid is dropped onto a convex face of a convex metallic mold.
Figure 6:
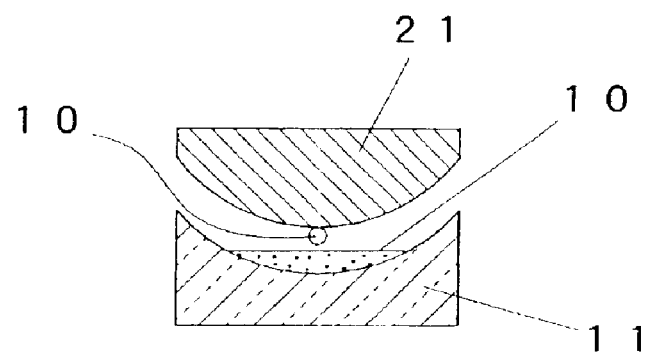
FIG. 6 shows a sectional view of a state in which the metallic mold is turned upside down from the state of FIG. 5 and placed over the lens, and the resin fluid layers on them are brought close to each other.
Figure 7:
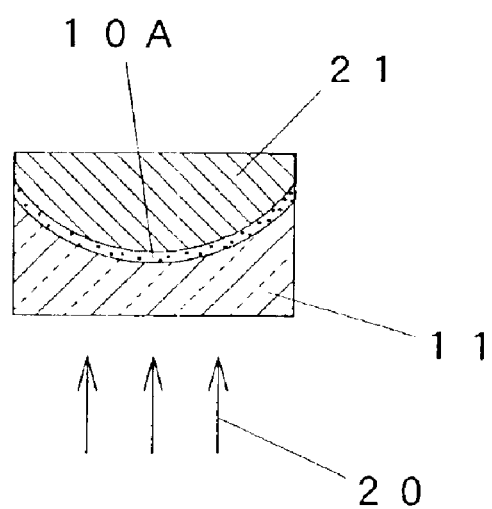
FIG. 7 shows a sectional view of a state in which a molded resin layer is formed by irradiation with ultraviolet rays.

The embodiment shown in FIG. 5 through FIG. 7 represents a method of manufacturing a compound aspheric lens using a metallic mold 21 having a convex aspheric face 21A and a concave glass lens 11 matching it. Like the embodiment described above, this embodiment also uses ultraviolet-curable resin fluid 10 purged with nitrogen gas ($N_2$), and the compound aspheric lens is manufactured without allowing bubbles to enter this resin fluid.

FIG. 5A shows a sectional view of a state in which ultraviolet-curable resin fluid 10 purged with nitrogen gas ($N_2$) is dropped onto the concave face 11A of a horizontally set concave glass lens 11 to constitute the base of an aspheric lens and a prescribed length of time has passed. The resin fluid 10 over this concave face 11A becomes flat after the lapse of the prescribed length of time.

FIG. 5B shows a sectional view of a state in which ultraviolet-curable resin fluid 10 purged with nitrogen gas ($N_2$) is dropped onto the central part of the aspheric face 21A of the metallic mold 21, the face 21A having a desired convex and directed upward, in a quantity small enough not to drop off when the mold is inverted. Since the resin fluid 10 has a suitable level of viscosity, it does not drop off the convex aspheric face 21A unless its quantity is too large. In this state, the metallic mold 21 is turned upside down and placed over the lens 11, and the lens and the mold are brought close to each until the resin fluid 10 over the concave face 11A of the lens 11 comes into contact with the tip of the resin fluid 10 over the aspheric face 21A of the metallic mold 21 (see FIG. 6).

A compound aspheric lens is produced by further narrowing the gap between the lens 11 and the metallic mold 21 than in the state of FIG. 6 until it reaches a prescribed width, placing the resin fluid 10 between them, curing the resin fluid 10 between the lens 11 and the metallic mold 21 by irradiating it with ultraviolet rays 20 in the state shown in FIG. 7, and separating the cured molded resin layer 1A from its interface with the metallic mold 21.

The suitable viscosity of the ultraviolet-curable resin fluid 10 for use here is 1000 to 1300 cps and 1000 to 2500 cps. Preferably, the ultraviolet-curable resin fluid 10 should be a photopolymeric acrylate-based ultraviolet-curable resin fluid that is cured by a radical polymeric reaction.

The quantity of the resin fluid 10 dropped onto the side to be inverted need not be large. A minute quantity of about φ1 to 2 mm would suffice. This quantity of the resin fluid 10 is minute enough not to allow the fluid to drop off the mold surface when it is inverted, and the contact faces of the resin fluid 10 layers over the lens 11 and the metallic mold 21 can be gradually expanded from a very narrow area, in so to speak a point contact state, in the state in which the lens 11 and the metallic mold 21 are brought close to each other to positions having the prescribed gap between them. By the prior art, there is the fear of allowing bubbles (air bubbles) to enter because the contact face between the metallic mold 21 and the resin fluid 10 or between the lens 11 and the resin fluid 10 is large, constituting so to speak a state of face contact.

Preferably, the surface of the lens 11 should be silane-coupled in advance to increase the adhesiveness between the lens 11 and the molded resin layer 10A. The silane coupling agent can be diluted to a 2 weight % ethanol solution for use in this process.

In this embodiment of the invention, the resin fluid 10 is dropped onto the central part of the convex aspheric face 21A of the metallic mold 21 in a quantity small enough not to drop off when the mold is inverted; onto the concave face 11A of the concave lens 11, on the other hand, is dropped the resin fluid 10; the convex face (the aspheric face 21A) of the metallic mold 21 is inverted so that the convex face be directed downwards towards the resin fluid 10, staying on the concave face 11A with its surface substantially flattened, to bring the resin fluid 10 on its central part into contact in a narrow range in, so to speak, point contact, with the resin fluid 10 on the concave face 11A of the lens. As the contact face of the resin fluid 10 is gradually expanded, bubbles (air bubbles) can be prevented from entering the molded resin layer, and the efficiency percentage is also enhanced.

Especially in this embodiment, as the resin fluid 10 is dropped onto the metallic mold 21 having the convex aspheric face 21A in a quantity small enough not to drop off when the mold is inverted and the resin fluid 10 is kept staying on the concave face 11A of the concave lens 11, it is useful for manufacturing lenses with a large aspheric face quantity and/or a molded resin layer with a great central thickness.

Both in the embodiment shown in FIG. 2 through FIG. 4 and in the other embodiment shown in FIG. 5 through FIG. 7, bubbles (air bubbles) can be prevented from entering the molded resin layer 10A.

Further according to the present invention, as shown in FIG. 1 nitrogen gas ($N_2$) is supplied into the syringe storing the ultraviolet-curable resin fluid 10. The use of the ultraviolet-curable resin fluid 10 purged with the nitrogen gas ($N_2$) succeeded in reducing the percentage of rejected products, compared with the use of the ultraviolet-curable resin fluid 10 purged with compressed air, which is the usual practice according to the prior art.

Thus, by the use of the ultraviolet-curable resin fluid 10 purged with nitrogen gas ($N_2$), significant improvement has been achieved against exfoliation and other trouble on the interface between the molded resin layer and the lens and white feather-like cracks or fissures and other trouble in the molded resin layer which would otherwise occur at the step of separating the molded resin layer 10A, cured by irradiation with ultraviolet rays, from the metallic mold (aspheric face).

The suitable viscosity of the ultraviolet-curable resin fluid 10 for use in the embodiments described above is 1000 to 1300 cps and 1000 to 2500 cps. The ultraviolet-curable resin fluid 10 is an acrylate-based ultraviolet-curable resin fluid that is cured by a radical polymeric reaction. This acrylate-based ultraviolet-curable resin fluid is subjected to a chemical reaction by the energy of ultraviolet rays, and changes from a fluid state to a solid state (or is cured). Thus the energy of ultraviolet rays gives rise to radicals (active species), which react on the reactive groups of monomers and oligomers to cause polymerization to start, thereby causing the resin fluid to cure.

However, when this kind of photopolymeric ultraviolet-curable resin fluid, especially ultraviolet-curable resin that is cured by radical polymeric reaction, comes into contact with oxygen in the atmosphere, the oxygen may react on and consume radicals and deactivate the resin.

Thus by the prior art method, purging of ultraviolet-curable resin fluid 10 stored in the syringe 3 with compressed air that is supplied into the syringe 3 may cause the ultraviolet-curable resin fluid 10 in the syringe 3 to be deactivated and deteriorated by oxygen, with the presumable results that (1) exfoliation occurs on the interface between the lens and the molded resin layer when the metallic mold is separated from the molded resin layer, because the resin fluid is prevented from sufficient curing by the inhibition of the radical polymeric reaction by the oxygen, and (2) cracks and fissures arise in the molded resin layer cured by irradiation with ultraviolet rays because the compound aspheric lens is manufactured using oxygen-deteriorated resin fluid.

Therefore, the dropping of the resin fluid 10 purged with nitrogen gas ($N_2$) supplied into the syringe 3 in which the ultraviolet-curable resin fluid 10 is stored (see FIG. 1), as in the embodiments of the invention, serves to prevent the resin fluid 10 from deactivation and deterioration and accordingly the inhibition of a radical polymeric reaction by oxygen at the time of curing by irradiation with ultraviolet rays, resulting in successful formation of the molded resin layer 10A by sufficient curing of the resin fluid 10. Where a compound aspheric lens is produced by using this resin fluid 10 purged with nitrogen gas ($N_2$), the exfoliation of the interface between the lens 1 or 11 and the molded resin layer 10A which otherwise occur when the metallic mold 2 or 21 is separated from the molded resin layer 10A can be restrained, and moreover the molded resin layer 10A can be protected from cracks and fissures, and it is thereby made possible to reduce the occurrence of rejected products.

Table 1 shows the percentages defective (referring to cracks, fissures, exfoliation, etc.) of compound aspheric lenses manufactured by using ultraviolet-curable resin fluid 10 purged with compressed air supplied into the syringe storing the ultraviolet-curable resin fluid 10 as in the prior art process (Comparative Examples 1 and 2) and the percentages defective (referring to cracks, fissures, exfoliation, etc.) of compound aspheric lenses (Comparative Examples) manufactured by using ultraviolet-curable resin fluid 10 purged with nitrogen gas supplied into the syringe storing the ultraviolet-curable resin fluid 10.

The resin fluid 10 used in this comparison is an acrylate-based ultraviolet-curable resin fluid that is cured by a radical polymeric reaction.

TABLE 1

|  | Base lens | Central thickness | Outside diameter | Radius of curvature | Resin fluid purged with | Percentage defective |
|---|---|---|---|---|---|---|
| Embodiment 1 | Convex lens | 200 μm | φ57 mm | R99 | Nitrogen gas ($N_2$) | 7.0% |
| Embodiment 2 | Concave lens | 150 μm | φ51 mm | R37 |  | 2.2% |
| Comparative Example 1 | Convex lens | 200 μm | φ57 mm | R99 | Compressed air ($O_2$) | 27.7% |
| Comparative Example 2 | Concave lens | 150 μm | φ51 mm | R37 |  | 17.8% |

In Embodiment 1 and Comparative Example 1, a composite aspheric face was produced by using as the convex lens to constitute the base of the aspheric lens a glass lens of 200 μm in central thickness, φ57 mm in outside diameter and R99 in radius of curvature (see FIG. 2), while in Embodiment 2 and Comparative Example 2, a composite aspheric face was produced by using as the concave lens to constitute the base of the aspheric lens a glass lens of 150 μm in central thickness, φ51 mm in outside diameter and R37 in radius of curvature (see FIG. 5). In any of the embodiments and the comparative examples, the compound aspheric lens was produced without allowing bubbles (air bubbles) to enter the molded resin layer 10A.

Thus in producing a compound aspheric lens having the convex lens 1 as its base (Embodiment 1 and Comparative Example 1), as in the embodiment of the invention shown in FIG. 2 through FIG. 4, the resin fluid 10 let stay on the aspheric face 2A of the concave metallic mold 2 and the convex face 1A of the lens are brought into point contact with each other, and the contact face between the metallic mold 2 and the resin fluid 10 is expanded afterwards, resulting in production of the compound aspheric lens without allowing bubbles (air bubbles) to enter the molded resin layer 10A. Further in producing a compound aspheric lens having the concave lens 11 as its base (Embodiment 2 and Comparative Example 2), as in the other embodiment of the invention shown in FIG. 5 through FIG. 7, the resin fluid 10 let stay on the concave face 11A of the lens 11 and the resin fluid 10 dropped onto the central part of the aspheric face 21A of the convex metallic mold 21 in a quantity small enough not to drop off when the mold is inverted are brought into point contact with each other, and the contact face between the metallic mold 2 and the resin fluid 10 is expanded afterwards, resulting in production of the compound aspheric lens without allowing bubbles (air bubbles) to enter the molded resin layer 10A.

As shown in Table 1, where the resin fluid purged with compressed air was used, the percentage defective was about 20 to 30%, the percentage, representing the occurrence of cracks, fissures, exfoliation or the like attributable to the molded resin layer was reduced to less than 10% by the use of the resin fluid purged with nitrogen gas.

Thus, the use of resin fluid purged with nitrogen gas in producing compound aspheric lenses serves to prevent oxygen from deactivating and deteriorating the resin fluid 10 stored in the syringe and from inhibiting the radical polymeric reaction to ensure sufficient curing of the resin fluid 10 by irradiation with ultraviolet rays to enable the molded resin layer 10A to be formed, resulting in a cutback on the percentage defective (representing cracks, fissures, exfoliation or the like).

What is claimed is:

1. A method of manufacturing a compound aspheric lens, comprising the steps of:
   supplying nitrogen gas into a syringe for storing ultraviolet-curable resin fluid, and dropping the ultraviolet-curable resin fluid purged with the nitrogen gas onto an aspheric face of a metallic mold set horizontally, said aspheric face having a desired concave face;
   bringing a convex lens to constitute the base of the aspheric lens close to the metallic mold and stopping the movement of the lens just before it comes into contact with the ultraviolet-curable resin fluid;
   inclining the metallic mold and the lens together to cause the ultraviolet-curable resin fluid to flux;
   after bringing the lens into contact with this fluxed and swelled ultraviolet-curable resin fluid in a narrow range, moving the lens to a prescribed position relative to the metallic mold to place the ultraviolet-curable resin fluid between the lens and the metallic mold;
   returning the lens and the metallic mold together, with the ultraviolet-curable resin fluid held between them, from the inclined state to the horizontal state;
   irradiating the ultraviolet-curable resin fluid with ultraviolet rays to cure the resin fluid; and
   separating the molded resin layer that has been cured from its interface with the metallic mold.

2. The method of manufacturing a compound aspheric lens, as set forth in claim 1, wherein an overall angle of inclination of said lens and metallic mold together is 30 to 40 degrees.

3. The method of manufacturing a compound aspheric lens, as set forth in claim 1 or 2, wherein the aspheric face of said metallic mold is plated with nickel.

4. The method of manufacturing a compound aspheric lens, as set forth in claim 1 or 2, wherein said ultraviolet-curable resin fluid is a photopolymeric acrylate-based ultraviolet-curable resin fluid that is cured by a radical polymeric reaction to irradiation with ultraviolet rays.

5. The method of manufacturing a compound aspheric lens, as set forth in claim 1 or 2, wherein a viscosity of said ultraviolet-curable resin fluid is 1000 to 2500 cps.

6. A method of manufacturing a compound aspheric lens, comprising the steps of:
   supplying nitrogen gas into a syringe for storing ultraviolet-curable resin fluid, and dropping the ultraviolet-curable resin fluid purged with the nitrogen gas onto a concave face of a concave lens which is to constitute the base of an aspheric lens set horizontally;
   dropping the ultraviolet-curable resin fluid purged with said nitrogen gas onto a central part of an aspheric face of a metallic mold, the mold having a desired convex aspheric face, the face being directed upward, and the fluid being dropped in a quantity small enough not to drop off when the mold is inverted;
   turning the metallic mold upside down and placing it over said lens;
   bringing the resin fluid on the concave face of the lens and the tip of the resin fluid on the aspheric face of the metallic mold close enough to come into contact with each other;
   narrowing the gap between the lens and the metallic mold to a prescribed extent to place the resin fluid between them;
   curing the resin fluid between the lens and the metallic mold by irradiation with ultraviolet rays; and
   separating the molded resin layer that has been cured from its interface with the metallic mold.

7. The method of manufacturing a compound aspheric lens, as set forth in claim 6, wherein the quantity of the ultraviolet-curable resin fluid 10 dropped onto the side to be turned upside down is about 1 to 2 mm per drop and one drop thereof is dripped.

8. The method of manufacturing a compound aspheric lens, as set forth in claim 6 or 7, wherein said ultraviolet-curable resin fluid is a photopolymeric acrylate-based ultraviolet-curable resin fluid that is cured by a radical polymeric reaction to irradiation with ultraviolet rays.

9. The method of manufacturing a compound aspheric lens, as set forth in claim 6 or 7, wherein a viscosity of said ultraviolet-curable resin fluid is 1000 to 2500 cps.

* * * * *